(12) United States Patent
Takahashi

(10) Patent No.: US 6,341,191 B1
(45) Date of Patent: Jan. 22, 2002

(54) VARIABLE ATTENUATION TYPE OPTICAL POWER ATTENUATOR WITH LATCHING RATCHET

(75) Inventor: Mitsuo Takahashi, Matsudo (JP)

(73) Assignee: Seikoh Giken Co., Ltd., Matsudo (JP)

( * ) Notice: Subject to any disclaimer, the term of this patent is extended or adjusted under 35 U.S.C. 154(b) by 0 days.

(21) Appl. No.: 09/291,067

(22) Filed: Apr. 14, 1999

(30) Foreign Application Priority Data

Jul. 7, 1998 (JP) ............................................. 10-191771

(51) Int. Cl.$^7$ ................................................. G02B 6/00
(52) U.S. Cl. ........................... 385/140; 385/23; 385/53; 385/56; 385/60
(58) Field of Search ........................... 385/140, 23, 53, 385/56, 60, 67, 76; 359/336, 352, 487, 569

(56) References Cited

U.S. PATENT DOCUMENTS

| | | | | |
|---|---|---|---|---|
| 4,717,234 A | * | 1/1988 | Barlow et al. | 385/140 |
| 4,878,730 A | * | 11/1989 | Wall | 385/140 |
| 4,893,889 A | * | 1/1990 | Iwakiri et al. | 385/140 |
| 5,050,956 A | * | 9/1991 | Carpenter et al. | 385/140 |
| 5,066,094 A | * | 11/1991 | Takahashi | 385/140 |
| 5,136,681 A | | 8/1992 | Takahashi | |
| 6,062,739 A | * | 5/2000 | Blake et al. | 385/76 |

* cited by examiner

Primary Examiner—Richard A. Rosenberger
Assistant Examiner—Sang H. Nguyen
(74) Attorney, Agent, or Firm—Venable; Robert J. Frank; Gabor J. Kelemen

(57) ABSTRACT

A variable attenuation type optical power attenuator permits easier adjustment of the amount of optical attenuation and it is able to securely maintained an adjusted or set amount of attenuation. The variable attenuation type optical power attenuator employs a fixed ferrule and a rotating ferrule that have their end surfaces polished, together with the central optical fibers thereof, to be formed into inclined end surfaces. An alignment sleeve supports the fixed and rotating ferrules with optical fibers so that the distal ends thereof are opposed and that the ferrules may be relatively rotated, thus making up an assembly composed of a pair of ferrules. The assembly of the paired ferrules is supported in a rotating housing by a fixed housing. The variable attenuation type optical power attenuator adjusts the distance between the optical fiber end of the fixed ferrule and that of the rotating ferrule by rotating the rotating housing to change the relative rotational angle in relation to the fixed housing. The new rotational angle thus obtained is maintained by the engagement between the face ratchet of a ratchet ring provided on the fixed housing and the face ratchet of the rotating housing.

13 Claims, 6 Drawing Sheets

SECTION AT LINE B-B

SECTION AT LINE A-A

PRIOR ART

VARIABLE ATTENUATION TYPE OPTICAL POWER ATTENUATOR WITH LATCHING RATCHET

BACKGROUND OF THE INVENTION

1. Field of the Invention

The present invention relates to a variable attenuation type optical power attenuator used for an optical fiber communications system. More particularly, the invention relates to an optical power attenuator of a new variable attenuation type in which a pair of ferrules having optical fibers with end surfaces thereof formed to be inclined against a plane perpendicular to the optical axis are oppositely aligned coaxially in the hole of an alignment sleeve. One of the paired ferrules is rotated to change the distance between the optical fiber end surfaces so as to permit continuous change of optical power attenuation and to automatically fix and maintain any desired optical power attenuation position.

2. Description of the Related Art

Referring to FIG. 4A and FIG. 4B, the principle of variable optical power attenuation will be described. The inventor has already proposed an optical power attenuator of the variable attenuation type, which employs the principle, under U.S. Pat. No. 5,136,681. FIG. 4A is a sectional view illustrating a setting for a minimum optical power attenuation, while FIG. 4B is a sectional view illustrating a setting for a maximum optical power attenuation. A pair of ferrules 8 and 9 with optical fibers, the end surfaces of which are formed to be inclined at an angle θ with respect to a surface perpendicular to the optical axis thereof, are oppositely aligned coaxially in the hole of an alignment sleeve 17. One of the ferrules, for example, the ferrule 9, is rotated to change a distance S between the end surfaces of the optical fibers so as to continuously vary the optical power attenuation.

There has been a strong demand for actually using the variable attenuation type optical power attenuator, which has been disclosed under U.S. Pat. No. 5,136,681, for an optical fiber communications circuit or the like of a CATV, etc. Putting this variable attenuation type optical power attenuator to practical use has been facing the following main technological task to be achieved. The variable attenuation type optical power attenuator has to permit easy adjustment or setting to a desired optical power attenuation value, and once the optical power attenuation value has been adjusted or set, this value must not be disturbed by an external force such as mechanical vibration or impact.

SUMMARY OF THE INVENTION

An object of the present invention is to provide a variable attenuation type optical power attenuator that has successfully achieved the task in the conventional variable attenuation type optical power attenuator with the rotating ferrule as set forth above.

It is a further specific object of the invention to provide a new variable attenuation type of optical power attenuator that allows the amount of optical power attenuation to be continuously changed and also enables a set optical power attenuation point to be automatically fixed and maintained. In this new variable attenuation type of variable optical power attenuator, a face ratchet of a ratchet ring installed on a fixed ferrule housing such that it may linearly move in the axial direction is automatically engaged with or disengaged from a face ratchet of a ratchet ring provided in association with a rotating ferrule housing by rotating the rotating housing.

It is another object of the invention to provide a variable attenuation type optical power attenuator with a latching ratchet that can be used as an FC type variable attenuation type optical power attenuator.

To these ends, according to one aspect of the invention, there is provided a variable attenuation optical power attenuator with a latching ratchet, including: a fixed ferrule and a rotating ferrule having the end surfaces thereof polished, together with central optical fibers thereof, to be formed into inclined surfaces; an alignment sleeve which receives the fixed and rotating ferrules with optical fibers in such a manner that the distal ends thereof are opposed to each other and the ferrules may be relatively rotated; a fixed housing which restricts the rotation of the fixed ferrule and which receives the alignment sleeve and the rotating ferrule; a rotating housing which has a face ratchet facing the fixed housing and which is joined by a threaded portioned portion such that it may rotationally move forward or backward in relation to the fixed housing while it is coupled to the fixed ferrule to restrict the rotation of the fixed ferrule; a ratchet ring which has its rotation restricted by the fixed housing, which is joined such that it may move forward or backward while being urged by a first spring toward the rotating housing, and which has a face ratchet engaging a face ratchet of the rotating housing; and a second spring provided between the rotating ferrule with the optical fiber and the rotating housing; wherein the rotating housing is rotated to change the relative rotational angle with respect to the fixed housing so as to adjust the distance between the optical fiber end surface of the fixed ferrule and that of the rotating ferrule.

According to another aspect of the invention, there is provided a variable attenuation type optical power attenuator with a latching ratchet, including: a pair of ferrules with optical fibers having the end surfaces thereof polished, together with the central optical fibers thereof, to be formed into inclined surfaces and which are respectively provided with flanges having engaging portions on the outer peripheries thereof; an alignment sleeve which receives the fixed and rotating ferrules with optical fibers in such a manner that the ends thereof are opposed to each other and the ferrules may be relatively rotated; a fixed housing which has an engaging portion which engages the flange of the fixed ferrule to restrict the rotation, a portion for receiving the alignment sleeve, a coupling threaded portion, and a rectilinear joining portion; a rotating housing which has a face ratchet having many (n) teeth, a threaded portion engaging the coupling threaded portion of the fixed housing, and an engaging portion which engages the engaging portion of the flange of the rotating ferrule with the optical fiber; a ratchet ring equipped with a face ratchet which engages the face ratchet of the rotating housing and a rectilinear joining portion which engages the rectilinear joining portion of the fixed housing; and first and second coil springs; wherein the fixed and rotating ferrules, which have been coupled by the alignment sleeve, are inserted in the fixed housing by joining the flange of the fixed ferrule to the rectilinear joining portion; the rotating housing is joined by a threaded portion to the fixed housing with the second coil spring inserted between the flange of the rotating ferrule with the optical fiber and the rotating housing; and the ratchet ring is engaged with the rectilinear joining portion of the fixed housing with the first coil spring inserted between the rotating housing and the ratchet ring, and the face ratchet is opposed to the face ratchet of the rotating housing.

In a preferred form of the variable attenuation optical power attenuator with the latching ratchet; each time the rotating housing is turned by 2π/2n, the ratchet ring automatically moves linearly in the axial direction along the surface of the face ratchet to disengage the face ratchets; and when the ratchet ring is brought back to a home position thereof by the coil spring to re-engage the face ratchets, the rotational angle of the rotating housing is shifted to adjust the optical power attenuation value on at a pitch of 1/N (N =Number of the teeth of each of the face ratchets), and the adjusted rotational angle can be fixed and maintained.

In another preferred form, the outer end surfaces of the fixed housing and the rotating housing are respectively provided with engaging portions such as threaded portions that engage optical connector plugs or optical connector adapters to constitute an FC variable attenuation type optical power attenuator with a latching ratchet.

In yet another preferred form, the face ratchets of the variable attenuation optical power attenuator with the latching ratchet may have ratchet teeth which have apex angles of about 60 degrees.

In a further preferred from, the engaging portions of the flanges of the ferrules may be axial grooves.

In a further preferred form, one or both of the optical fibers supported by the fixed ferrule and the rotating ferrule may be an attenuation optical fiber or fibers.

More specifically, the variable attenuation type optical power attenuator with a latching ratchet in accordance with the present invention is assembled as follows. One end surface of each of the two ferrules with optical fibers, to which flanges provided with detent means such as keyways on the outer diameter surfaces thereof are securely attached, is finished to be inclined at 4 degrees or more with respect to a surface perpendicular to the optical axis of the optical fibers. With the inclined end surfaces opposed to each other, the ferrules with the optical fibers are rotatably inserted in the hole of an alignment sleeve to make up a ferrule assembly with the optical fibers.

A key is fitted in a larger outer diameter surface of a stepped outside diameter surface and a coil spring is fitted in a smaller outer diameter surface; a key that engages the keyway of the flange of one of the ferrules with optical fibers is provided on the inner diameter surface; a hole in which the alignment sleeve is inserted is provided at the central part; and a fixed housing equipped with a threaded portion is provided on the other end surface. A face ratchet having at least 20 teeth and a threaded portion that engages the threaded portion of the fixed housing are provided on the outer diameter side. A key engaging the keyway of the flange of the other ferrule with the optical fiber is provided at the distal end of the threaded portion, and a rotating housing equipped with a back facing hole in the inner surface to house the coil spring therein is provided. A keyway engaging with the key on the outer diameter surface of the fixed housing is provided on one end surface of the outer diameter of the ratchet ring, a face ratchet which engages the face ratchet of the rotating housing is provided on the other end surface thereof, and a back facing hole in which the coil spring is inserted is provided in the inner diameter surface. The ratchet ring is fitted, together with the coil spring, to the outer diameter surface of the fixed housing so that the keyway of the ratchet ring engages the key provided on the outer diameter of the fixed housing. Further, the keyway of the flange of one of the ferrules of the ferrule assembly with optical fibers is engaged with the key on the inside diameter surface of the fixed housing. Then, the keyway of the flange of the other ferrule of the ferrule assembly with the optical fibers is engaged with the key on the end surface of the rotating housing, and the fixed housing and the rotating housing are coupled by an engaging threaded portion.

In the variable attenuation type optical power attenuator with the latching ratchet, each time the rotating housing is rotated by 1/2N (N =Number of the teeth), the ratchet ring automatically moves in the axial direction linearly along the surface of the face ratchet to disengage the face ratchets, and when the ratchet ring is brought back to its home position by the coil spring to re-engage the face ratchets, the rotational angle of the rotating housing is changed at the pitch of 1/N (N=Number of the teeth of the face ratchet) thereby to adjust the optical attenuation value. The newly set rotational angle can be fixed and maintained.

DESCRIPTION OF THE PREFERRED EMBODIMENTS

The embodiments of a variable attenuation type optical power attenuator in accordance with the present invention will be described in more detail with reference to the accompanying drawings.

Figure 4A:
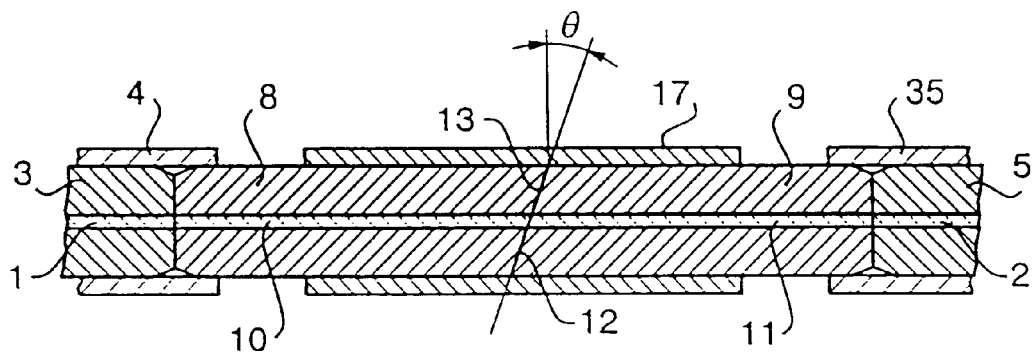
FIG. 4A is a sectional view illustrative of the principle of the variable attenuation of the variable attenuation type optical power attenuator with the latching ratchet in accordance with the present invention, the variable attenuation type optical power attenuator being in the coupled state for a minimum loss.
Figure 4B:
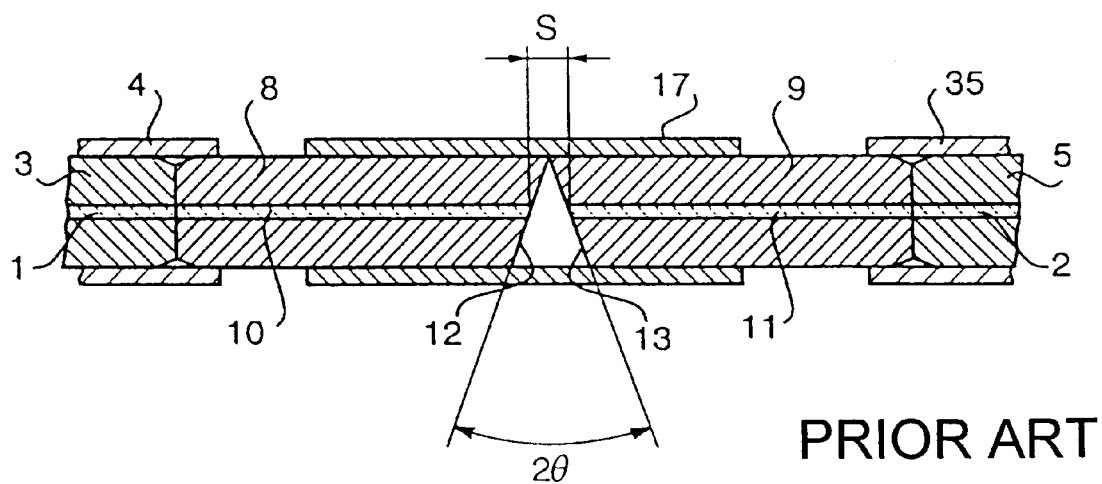
FIG. 4B is a sectional view illustrative of the principle of the variable attenuation of the variable attenuation type optical power attenuator with the latching ratchet in accordance with the present invention, the variable attenuation type optical power attenuator being in the coupled state for a maximum loss.

FIGS. 4A and 4B are sectional views for illustrating the principle of the variable attenuation of the variable attenuation type optical power attenuator with the latching ratchet in accordance with the present invention; FIG. 4A shows the variable attenuation type optical power attenuator in the coupled state for a minimum loss, while FIG. 4B shows it in the coupled state for a maximum loss.

Referring to the drawings, optical fibers 10 and 11 are inserted and fixed in the central holes of a fixed ferrule 8 and a rotatable ferrule 9, respectively. Coupling end surfaces 12 and 13 are polished so as to be inclined at an angle θ with respect to a surface perpendicular to an optical axis. FIG. 4A shows a state wherein ferrules 8 and 9 with the optical fibers 10 and 11 installed therein have been inserted in the hole of an alignment sleeve 17 with the inclined end surfaces 12 and 13 positioned in parallel. In this state, the distance between the end surfaces of the optical fibers is approximately zero, so that the optical attenuation is minimum. Ferrules 3 and 5 with optical fibers are external optical fiber circuits coupled to the ferrules of the variable attenuation type optical power attenuator through sleeves 4 and 35. The ferrules 3 and 5 with optical fibers respectively support optical fibers 1 and 2.

FIG. 4B shows a state wherein the ferrule 9 has been rotated 180 degrees. In this case, the opening angle formed between the ferrule end surfaces 12 and 13 and an air gap S between the ferrule end surfaces 12 and 13 continuously increase as the rotational angle of one of the ferrules increases. At the rotational angle 180 degrees, the opening angle between the ferrule end surface 12 and 13 reaches a maximum value 2θ; hence, the distance S between the ferrule end surfaces 12 and 13 also reaches a maximum value.

Figure 5:
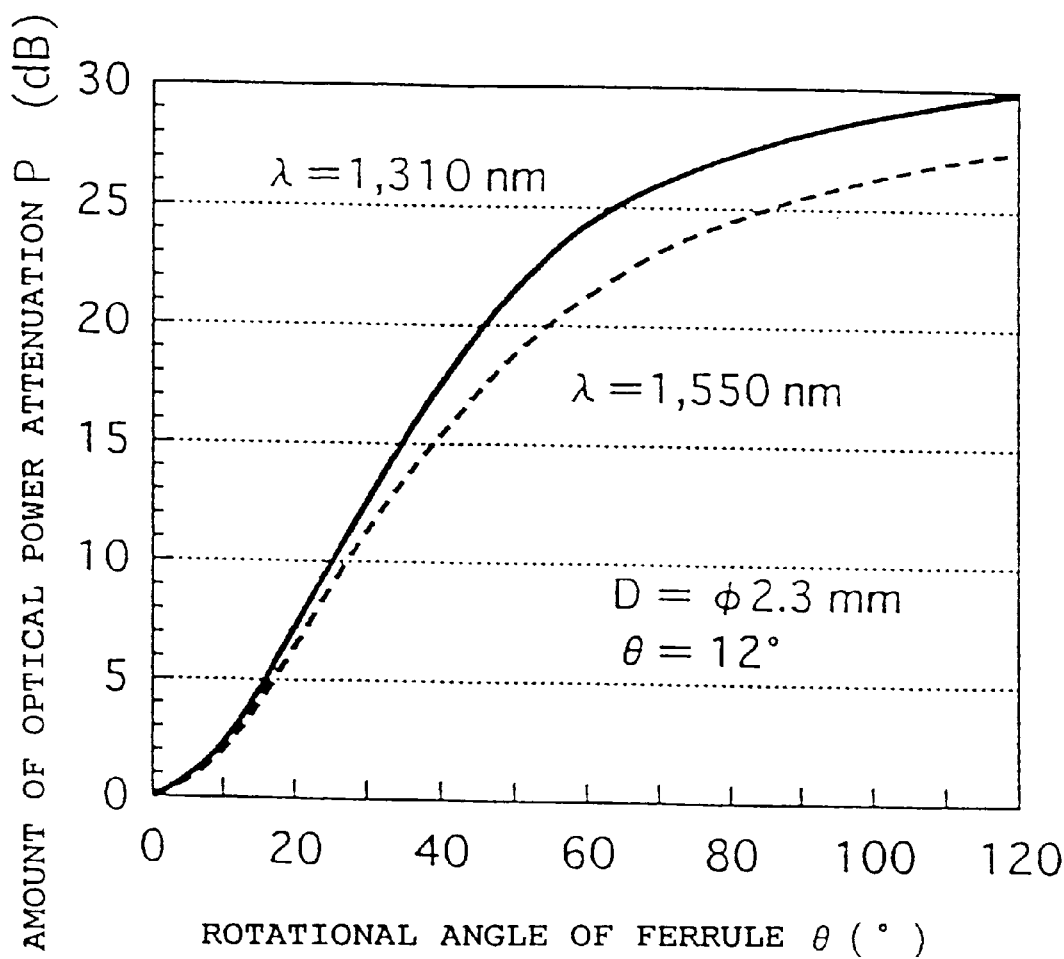
FIG. 5 is a graph showing the relationship between a ferrule rotational angle and optical attenuation of the variable attenuation type optical power attenuator.

FIG. 5 shows a graph illustrative of the relationship between the ferrule rotational angle and the optical attenuation of the variable attenuation type optical power attenuator. The values shows in the graph have been obtained by a measurement performed by the inventor; the graph shows the relationship between a ferrule rotational angle θ and an optical attenuation P when single-mode optical fibers are used, the effectively outside diameter of the ferrule ends is 2.3 mm, and the inclination angle θ is 12 degrees. In the graph, λ denotes the wavelength of each light source. As can be seen from the graph, the optical attenuation P varies according to the ferrule rotational angle θ.

FIGS. 1A through 1D are sketch drawing and sectional views of the constituent members of a first embodiment of the variable attenuation type optical power attenuator with a plug type latching ratchet in accordance with the present invention that conforms to the standard for FC optical connectors.

Figure 1A:
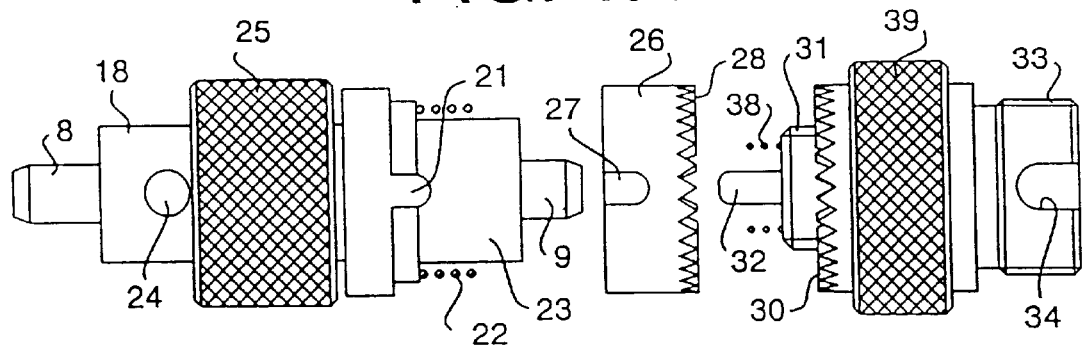
FIG. 1A is a front assembly view showing an embodiment of the variable attenuation type optical power attenuator with a latching ratchet in accordance with the present invention before it is assembled.
Figure 1B:
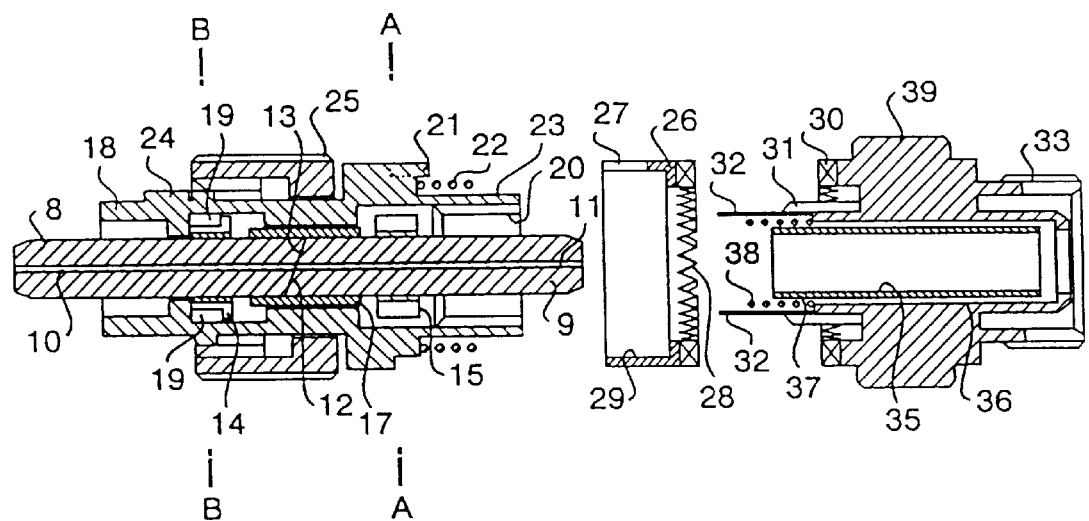
FIG. 1B is a sectional view of the embodiment shown in FIG. 1A.
Figure 1C:
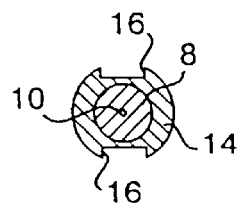
FIG. 1C is a sectional view taken at the line B—B of FIG. 1B, illustrating the relationship between a flange with a keyway and a ferrule.
Figure 1D:
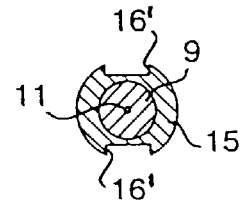
FIG. 1D is a sectional view taken at the line A—A of FIG. 1B, illustrating the relationship between a flange with a keyway and a ferrule.

FIG. 1A is a front assembly view showing an embodiment of the variable attenuation type optical power attenuator with a latching ratchet in accordance with the present invention before it is assembled, FIG. 1B is a sectional view of the embodiment shown in FIG. 1A, and FIGS. 1C and 1D are sectional views taken at the lines B—B and A—A of FIG. 1B respectively, illustrating the relationship between a flange with a keyway and a ferrule.

The optical fibers 10 and 11 are inserted and fixed in the central holes of coaxial ferrules 8 and 9, respectively, then the opposing end surfaces 12 and 13 for ferrules 8 and 9 respectively are polished into inclined surfaces having an angle of 12 degrees in relation to a plane perpendicular to the optical axis.

Flanges 14 and 15 with keyways are press-fitted and fixed to the outside diameter surfaces of the respectively ferrules 8 and 9 with optical fibers 10 and 11. As shown in FIGS. 1C and 1D, the flanges 14 and 15 are equipped with a pair of keyways 16 and 16' respectively. An alignment sleeve 17 rotatably receives the ferrules 8 and 9 with optical fibers such that the inclined end surfaces 12 and 13 are opposed to each other.

The inside diameter surface of a fixed housing 18 is provided with a key 19 that engages a keyway 16 of the flange 14, and an internal thread 20 at the right end thereof.

A guide key 21 is provided at the center of the outside diameter surface of the fixed housing 18, and a stepped outer diameter surface 23 surrounded by a coil spring 22 is provided at the right end outer periphery. Provided on the surface at the left in the drawing is an alignment pin 24 which engages an FC connector adapter (not shown). A coupling nut 25 is provided on the outer periphery.

The appearance and section of the ratchet ring are shown at the centers of FIG. 1A and FIG. 1B, respectively. One end surface of the ratchet ring 26 is provided with a keyway 27 that engages the guide key 21 of the fixed housing 18, while the other end surface thereof is provided with a face ratchet 28 having 32 teeth with 60-degree crossing angles. The ratchet ring 26 is provided with an inside diameter surface 29 (see FIG. 1B) for receiving the coil spring 22.

A rotatable housing 39 is provided with a face ratchet 30 having 32 teeth with 60-degree crossing angles. A threaded portion 31 engages the threaded portion 20 of the fixed housing 18. A key 32, which engages the keyway 16' of the flange 15, is provided on the ferrule 9. A threaded portion 33 and a keyway 34 provided at the right end of the rotatable housing 39 are respectively the threaded portion and an alignment keyway for engaging with an FC plug (not shown). An alignment sleeve 35 receives the ferrule 9 with the optical fiber. A central hole 36 of the rotatable housing 39 receives the alignment sleeve 35 and a back facing hole 37 formed continuously from the hole 36 houses a coil spring 38.

Figure 2A:
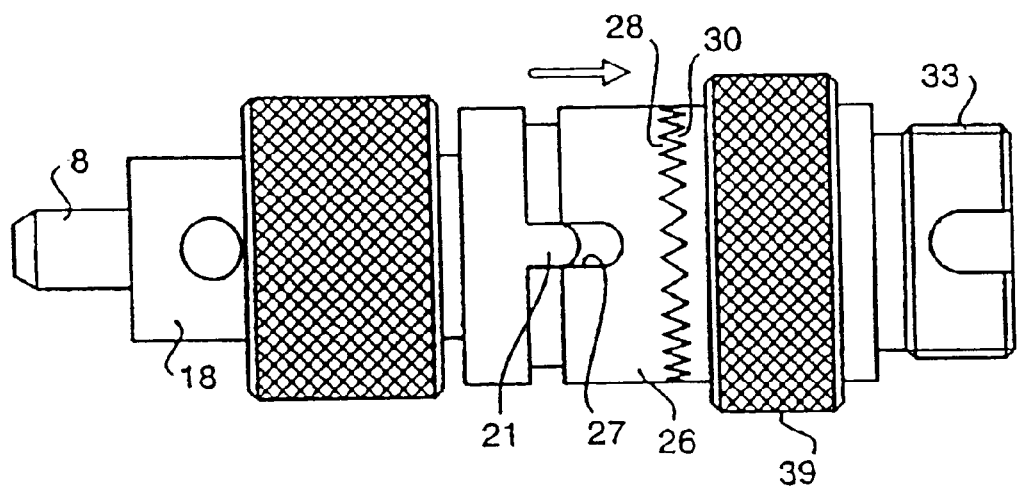
FIG. 2A is a front view of the embodiment shown in FIG. 1A in a coupled state wherein the loss is minimum.
Figure 2B:
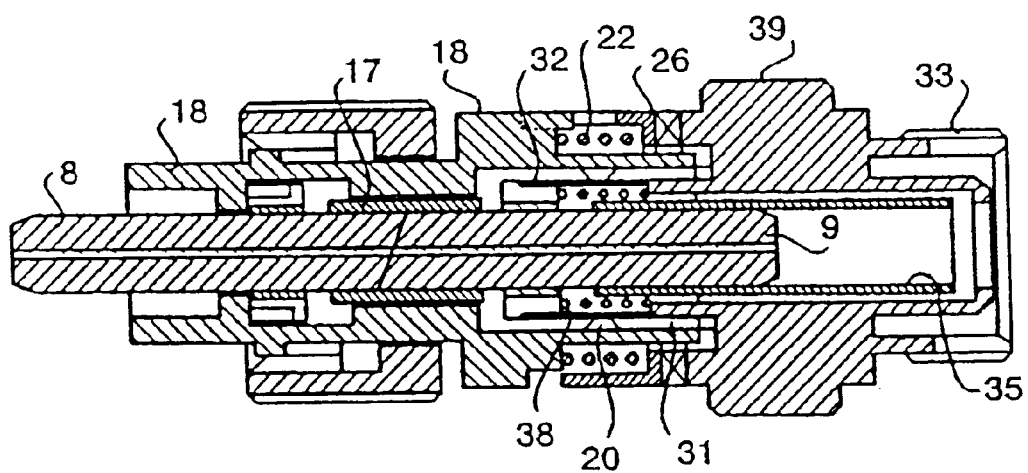
FIG. 2B is a sectional view of the embodiment shown in FIG. 2A.

FIG. 2A is a front view of the embodiment which has been described with reference to FIGS. 1A through 1D and which is in a coupled state set for a minimum loss. FIG. 2B is a sectional view of the embodiment shown in FIG. 2A.

In FIGS. 2A and 2B, the face ratchets 28 and 30 of the variable attenuation type optical power attenuator with the latching ratchet are in the engaged state.

The ratchet ring 26 is fitted together with the coil spring 22 in the outer diameter surface of the fixed housing 18, and the fixed housing 18 and the rotatable housing 39 are combined into one piece by the engaging threaded portions 20 and 31. At this time, the keyway 27 of the ratchet ring 26 is fitted in the guide key 21 beforehand. The ratchet ring 26 is urged by the coil spring 22 so as to be forcibly pushed toward the rotating housing 39 as indicated by the white arrow in FIG. 2A, thus causing the face ratchets 28 and 30 to be meshed with each other. This makes it possible to maintain the phase of the rotational directions of the fixed housing 18 and the rotatable housing 39.

Figure 3A:
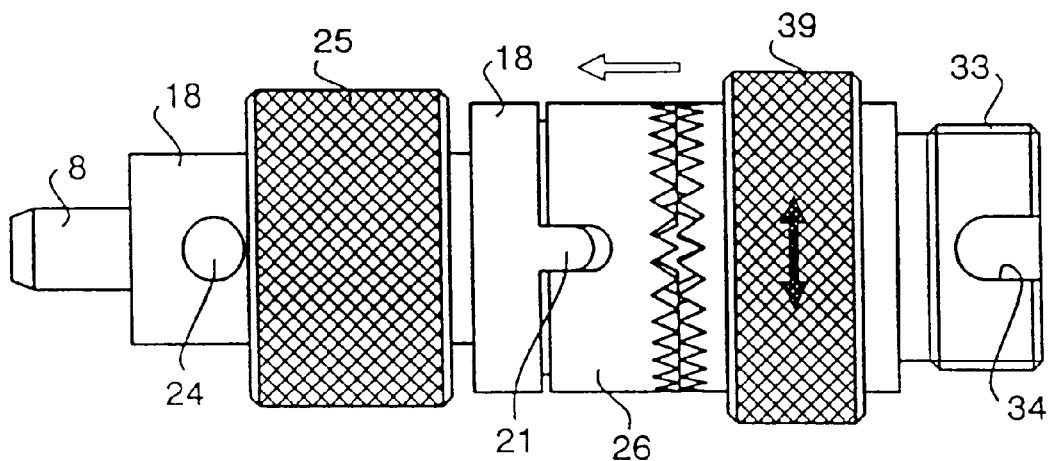
FIG. 3A is a front view of the embodiment shown in FIG. 1A in a coupled state wherein the loss is maximum.
Figure 3B:
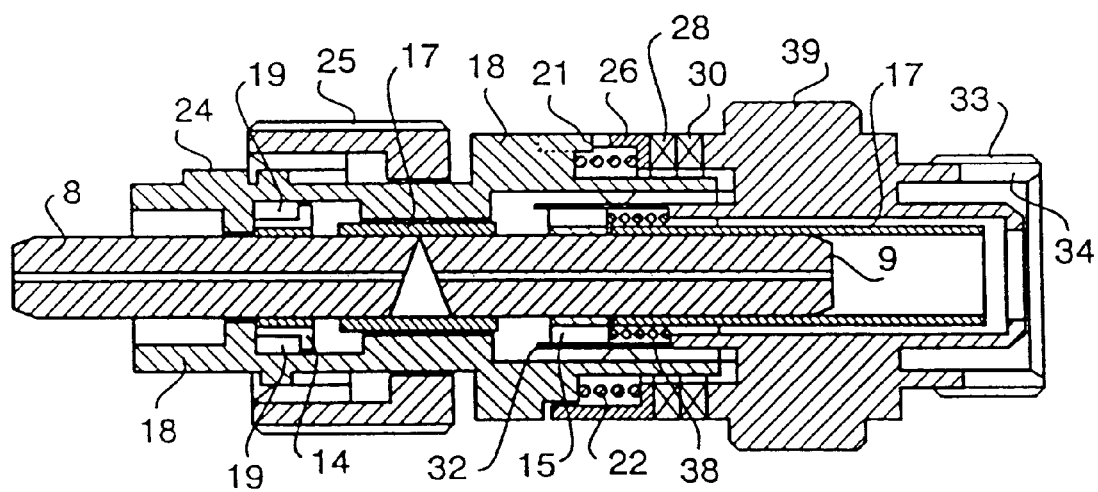
FIG. 3B is a sectional view of the embodiment shown in FIG. 3A.

FIGS. 3A and 3B show the appearance and section of the variable attenuation type optical power attenuator with the latching ratchet in accordance with the present invention made up by the constituent members described in conjunction with FIGS. 1A through 1D. The drawings show the face ratchets that have been disengaged by the rotation of the rotating housing 39.

When the rotatable housing 39 is rotated as indicated by the black arrows, the face ratchet 28 of the ratchet ring 26 slides along the face ratchet 30 of the rotatable housing 39 to begin disengagement from the face ratchet 30.

At the same time, the ratchet ring 26 is linearly retreated in the direction of the white arrow by the guide key 21 with the force of the coil spring 22 still applied thereto so as to disengage the face ratchets 28 and 30.

Turning the rotatable housing 39 slightly further brings the ratchet ring 26 to the home position thereof by the force of the coil spring 22, thus making it possible to maintain the constant phase of the rotational directions of the fixed housing 18 and the rotatable housing 39.

Figure 6:
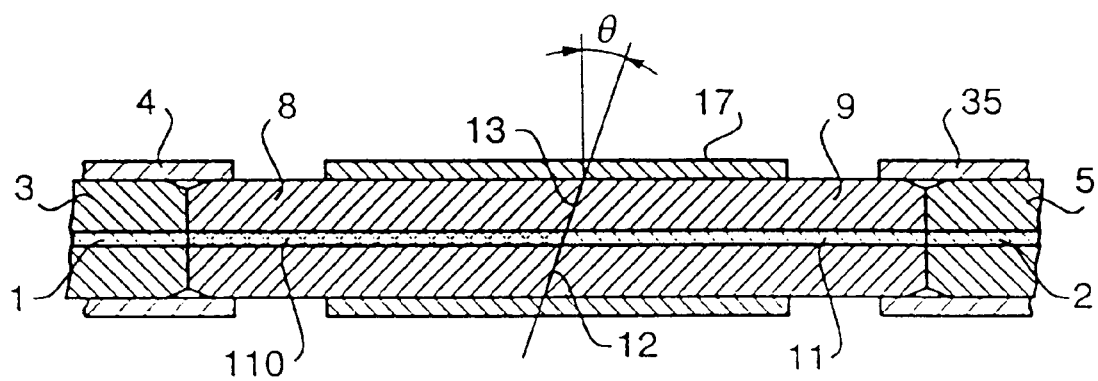
FIG. 6 is a sectional view showing a second embodiment of the variable attenuation type optical power attenuator with the latching ratchet in accordance with the present invention.

FIG. 6 is a sectional view showing the essential section of a second embodiment of the variable attenuation type optical power attenuator with a latching ratchet in accordance with the present invention. The second embodiment is identical to the first embodiment set forth above except that an optical fiber 110 inserted in a first ferrule 8 is an attenuation optical fiber. Thus, the variable attenuation based on the distance between the ends of the optical fibers that is changed by the rotation of a second optical fiber ferrule is obtained in addition to the fixed attenuation obtained by the optical fiber 110.

Figure 7:
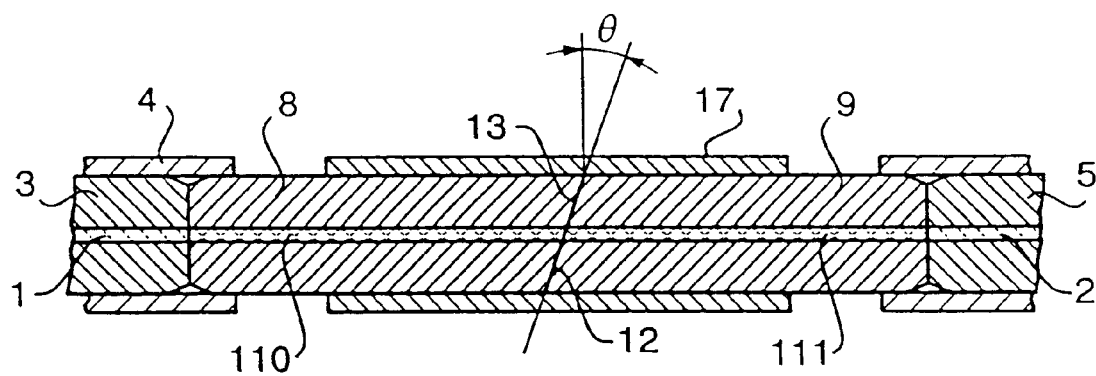
FIG. 7 is a sectional view showing a third embodiment of the variable attenuation type optical power attenuator with the latching ratchet in accordance with the present invention.

FIG. 7 is a sectional view showing the essential section of a third embodiment of the variable attenuation type optical power attenuator with a latching ratchet in accordance with the present invention. In the third embodiment, an optical fiber 111 inserted in the second ferrule 9 is also an attenuation optical fiber. The rest of the constitution is identical to the constitution of the first embodiment. Thus, the variable attenuation based on the distance between the ends of the optical fibers that is changed by the rotation of the second optical fiber ferrule is obtained in addition to the fixed attenuation obtained by the optical fibers 110 and 111.

As described in detail above, the variable attenuation type optical power attenuator with a latching ratchet in accordance with the present invention is able to continuously vary optical attenuation by changing the distance between optical fiber end surfaces by rotating the rotatable housing to automatically engage or disengage the face ratchet of the ratchet ring, which is axially installed on the fixed ferrule housing such that it may linearly move, with or from the face ratchet provided on the rotatable ferrule housing; it is also able to automatically fix and maintain an originally set optical power attenuation point. Hence, the variable attenuation type optical power attenuator in accordance with the invention permits easier operation and securely maintains a set condition.

Since the variable attenuation type optical power attenuator with the plug type latching ratchet in accordance with the invention operates as described above, it is possible to repeatedly move the ratchet ring 26 forward or backward for a rotational angle equivalent to 1/2N (N=Number of the teeth of each of the face ratchets 28 and 30). Therefore, the amount of the optical power attenuation can be set on the basis of the rotational angle equivalent to 1/N (N=Number of the teeth of each of the face ratchets 28 and 30), and the set rotational position can be fixed and maintained.

Further, an attenuation optical fiber or fibers having optical power attenuation characteristics may be used for one or both of the optical fibers employed for the variable attenuation type optical power attenuator with the plug type latching ratchet in accordance with the invention. When an attenuation optical fiber, for example, of 20 dB optical attenuation is used, the variable optical attenuation range will be 20 dB+α dB. This feature is ideally used when delicate adjustment is required in any variable optical attenuation range.

Although the invention has been described in detail above in connection with the preferred embodiments thereof, various modifications can be formed without departing from the spirit and scope of the invention. For instance, the engaging portions on both ends of the variable attenuation type optical power attenuator with the plug type latching ratchet in accordance with the invention may have an arbitrary composition such as the one that permits the connection of connector plugs to the engaging portions at both ends or the one that permits the connection of alignment adapters to the engaging portions at both ends.

What is claimed is:

1. A variable attenuation type optical power attenuator, comprising:

fixed and rotatable coaxial ferrules having respective optical fibers inserted therein along an optical axis of said ferrules, adjacent opposing end surfaces of said ferrules and said optical fibers being polished to provide surfaces inclined with respect to a plane perpendicular to said optical axis;

an alignment sleeve receiving therein said fixed and rotatable ferrules, said rotatable ferrule being rotatable with respect to said fixed ferrule within said alignment sleeve;

a fixed housing receiving said alignment sleeve, said fixed housing restricting rotation of said fixed ferrule and being provided with a first threaded portion;

a rotatable housing having a first face ratchet facing said fixed housing, said rotatable housing being joined by a second threaded portion to the first threaded portion of said fixed housing for rotational and axial movements of said rotatable housing with respect to said fixed housing;

a ratchet ring having a second face ratchet for engagement with said first face ratchet, said fixed housing restricting rotation of said ratchet ring, said ratchet ring being movable axially with respect to said fixed housing while being urged by a first spring toward said rotatable housing; and a second spring provided between said rotatable ferrule and said rotatable housing, whereby rotation of said rotatable housing changes the relative rotational angle of said rotatable ferrule with respect to said fixed housing so as to adjust the distance between the opposing ends of the optical fibers inserted in said fixed ferrule and said rotatable ferrule thereby adjusting the attenuation provided by the variable attenuator.

2. A variable attenuation type optical power attenuator according to claim 1, wherein outer end surfaces of said fixed housing and said rotatable housing are respectively provided with engagable portions for engagement with at least one of an optical connector plug and an optical connector adapter.

3. A variable attenuation type optical power attenuator with a latching ratchet according to claims 2, wherein said first and second face ratchets each have ratchet teeth having apex angles of about 60 degrees.

4. A variable attenuation type optical power attenuator with a latching ratchet according to claim 1, wherein said first and second face ratchets each have ratchet teeth having apex angles of about 60 degrees.

5. A variable attenuation type optical power attenuator according to claim 1, wherein at least one of the optical fibers inserted in said fixed ferrule and said rotatable ferrule is at least one optical attenuation fiber.

6. A variable attenuation type optical power attenuator, comprising:

first and second coaxial ferrules, each having first and second optical fibers inserted therein along an optical axis of said ferrules, adjacent opposing distal end surfaces of said ferrules and said optical fibers being polished to provide surfaces inclined with respect to a plane perpendicular to said optical axis; and first and second flanges having engaging surfaces on the outer peripheries of said first and second ferrules respectively;

an alignment sleeve receiving said first and second ferrules, said first and second ferrules being rotatable with respect to each other within said alignment sleeve;

a fixed housing having
  a first rectilinear joining portion engaging said first flange for restricting rotation of said first ferrule;
  a portion for receiving said alignment sleeve; and
  a coupling threaded portion;

a rotatable housing having
  a first face ratchet having a plurality of n teeth;
  a threaded portion engaging the coupling threaded portion of said fixed housing, and
  an engaging portion engaging the engaging portion of said second flange;

a ratchet ring having
  a second face ratchet engagable with said first face ratchet; and
  a second rectilinear joining portion engaging said first rectilinear joining portion; and first and second coil springs
  said first coil spring being inserted between said second flange and said rotatable housing; and
  said second coil spring being inserted between said rotatable housing and said ratchet ring.

7. A variable attenuation type optical power attenuator according to claim 6, wherein each time said rotatable housing is rotated by $2\pi/2n$ degrees, said ratchet ring automatically moves parallel to said optical axis along a surface of said second face ratchet to release engagement between said first and second face ratchets; and when said ratchet ring is restored to a home position at which said first and second face ratchets are re-engaged by said first coil spring, the rotational angle of said rotatable housing is changed to adjust an optical attenuation value of said attenuator at a pitch equivalent to 1/N, where N is the number of teeth of the face ratchet, and said changed rotational angle is fixed and maintained.

8. A variable attenuation type optical power attenuator according to claim 7 wherein outer end surfaces of said fixed housing and said rotatable housing are respectively provided with engagable portions for engagement with at least one of an optical connector plug and an optical connector adapter.

9. A variable attenuation type optical power attenuator with a latching ratchet according to claims 7, wherein said first and second face ratchets each have ratchet teeth having apex angles of about 60 degrees.

10. A variable attenuation type optical power attenuator according to claim 6 wherein outer end surfaces of said fixed housing and said rotatable housing are respectively provided with engagable portions for engagement with at least one of an optical connector plug and an optical connector adapter.

11. A variable attenuation type optical power attenuator with a latching ratchet according to claims 6, wherein said first and second face ratchets each have ratchet teeth having apex angles of about 60 degrees.

12. A variable attenuation type optical power attenuator with a latching ratchet according to claim 6, wherein the engaging portions of the first and second flanges of said first and second respective ferrules are axial grooves.

13. A variable attenuation type optical power attenuator according to claim 6, wherein at least one of the optical fibers inserted in said first ferrule and said second ferrule is at least one optical attenuation fiber.

* * * * *